(12) United States Patent
Pawar et al.

(10) Patent No.: US 8,359,063 B1
(45) Date of Patent: Jan. 22, 2013

(54) MULTI-ANTENNA MODE BASED CALL ADMISSION CONTROL

(75) Inventors: Hemanth Balaji Pawar, Herndon, VA (US); Swati Tiwari, Fairfax, VA (US); Krishna D. Sitaram, Chantilly, VA (US); Jong-hak Jung, Herndon, VA (US); Esmail Hejazi Dinan, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 740 days.

(21) Appl. No.: 12/257,545

(22) Filed: Oct. 24, 2008

(51) Int. Cl.
*H04M 1/00* (2006.01)

(52) U.S. Cl. ............... 455/552.1; 455/562.1; 455/575.7; 455/13.3; 455/63.3

(58) Field of Classification Search ............... 455/552.1, 455/550.1, 73, 13.1, 33.3, 254, 525, 560, 455/561, 456.5, 562.1, 575.7, 279.1, 450
See application file for complete search history.

(56) References Cited

U.S. PATENT DOCUMENTS

| | | | |
|---|---|---|---|
| 2006/0233277 A1 | 10/2006 | Chen | |
| 2007/0076612 A1 | 4/2007 | Iyer et al. | |
| 2007/0121500 A1 | 5/2007 | McBride et al. | |
| 2007/0286202 A1 | 12/2007 | Dos Remedios et al. | |
| 2008/0019333 A1* | 1/2008 | Kharia et al. | 370/338 |
| 2008/0049747 A1 | 2/2008 | McNaughton et al. | |
| 2008/0049753 A1 | 2/2008 | Heinze et al. | |
| 2008/0049787 A1 | 2/2008 | McNaughton et al. | |
| 2009/0042511 A1* | 2/2009 | Malladi | 455/62 |

* cited by examiner

*Primary Examiner* — Chuong A Ngo
(74) *Attorney, Agent, or Firm* — O'Brien Jones, PLLC (57) ABSTRACT

A first plurality of wireless devices associated with a wireless network element is communicated with using a first multi-antenna mode. There is a first number of the first plurality of wireless devices. A second plurality of wireless devices associated with the wireless network element is communicated with using a second multi-antenna mode. There is a second number of the second plurality of wireless devices. A request for traffic resources is received from a wireless device associated with the wireless network element. In response to the request for traffic resources, the request for traffic resources is granted based on whether the first number satisfies a first criteria and whether the second number satisfies a second criteria.

17 Claims, 5 Drawing Sheets

MULTI-ANTENNA MODE BASED CALL ADMISSION CONTROL

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of operating a communication system is disclosed. A first plurality of wireless devices associated with a wireless network element is communicated with using a first multi-antenna mode. There is a first number of the first plurality of wireless devices. A second plurality of wireless devices associated with the wireless network element is communicated with using a second multi-antenna mode. There is a second number of the second plurality of wireless devices. A request for traffic resources is received from a wireless device associated with the wireless network element. In response to the request for traffic resources, the request for traffic resources is granted based on whether the first number satisfies a first criteria and whether the second number satisfies a second criteria.

A method of allocating traffic resources is disclosed. A request for an allocation of traffic resources is received from a wireless device. A first number of wireless devices that are using a first multi-antenna mode to communicate with a wireless network element is determined. If the request for the allocation of traffic resources is granted, the wireless network element will provide the traffic resources. A second number of wireless devices that are using a second multi-antenna mode to communicate with the wireless network element is determined. Based on the first number satisfying a first criteria, and the second number satisfying a second criteria, it is determined whether to grant the request for the allocation of traffic resources.

A communication system is disclosed. A base station is in wireless communication with a first number of a first plurality of devices, a second number of a second plurality of devices, and a requesting device. The first plurality of devices is using a first multiple-input multiple-output (MIMO) technique to communicate with the base station. The second plurality of devices is using a second MIMO technique to communicate with the base station. A control system receives a request for an allocation of base station resources associated with the requesting device. The control system receives a first indicator of the first number and a second indicator of the second number. The control system determines whether to grant the request for an allocation of base station resources based on whether the first indicator satisfies a first criteria and whether the second indicator satisfies a second criteria.

DETAILED DESCRIPTION

In an embodiment, wireless devices may be operated in M by N multiple-input multiple-output (MIMO) antenna modes. M is the number of transmitters and/or antennas that a base station is using to transmit a data stream to a given wireless device. N is the number of receivers and/or antennas that a given wireless device is using to receive a data stream from a base station. In addition to MIMO modes that specify the number of transmitting and receiving antennas, there are MIMO modes that specify how the data stream is transmitted from the multiple transmitting antennas. Two of these modes are space-time coding MIMO and spatial multiplexing MIMO. These two modes, along with other multi-antenna techniques where M>1 and N>=1 may be referred to collectively as multi-antenna modes.

In an embodiment, a wireless device may send a request for traffic resources. It may be determined whether to grant the request for traffic resources based on the number of devices using a first multi-antenna mode and the number of devices using a second multi-antenna mode. In other words, for example, if there are more than a certain (configurable) number of devices using space time coding and less than another (configurable) number of devices using spatial multiplexing in the cell or sector serviced by a base station, the request for traffic resources is denied. Otherwise, it is granted.

Figure 1:
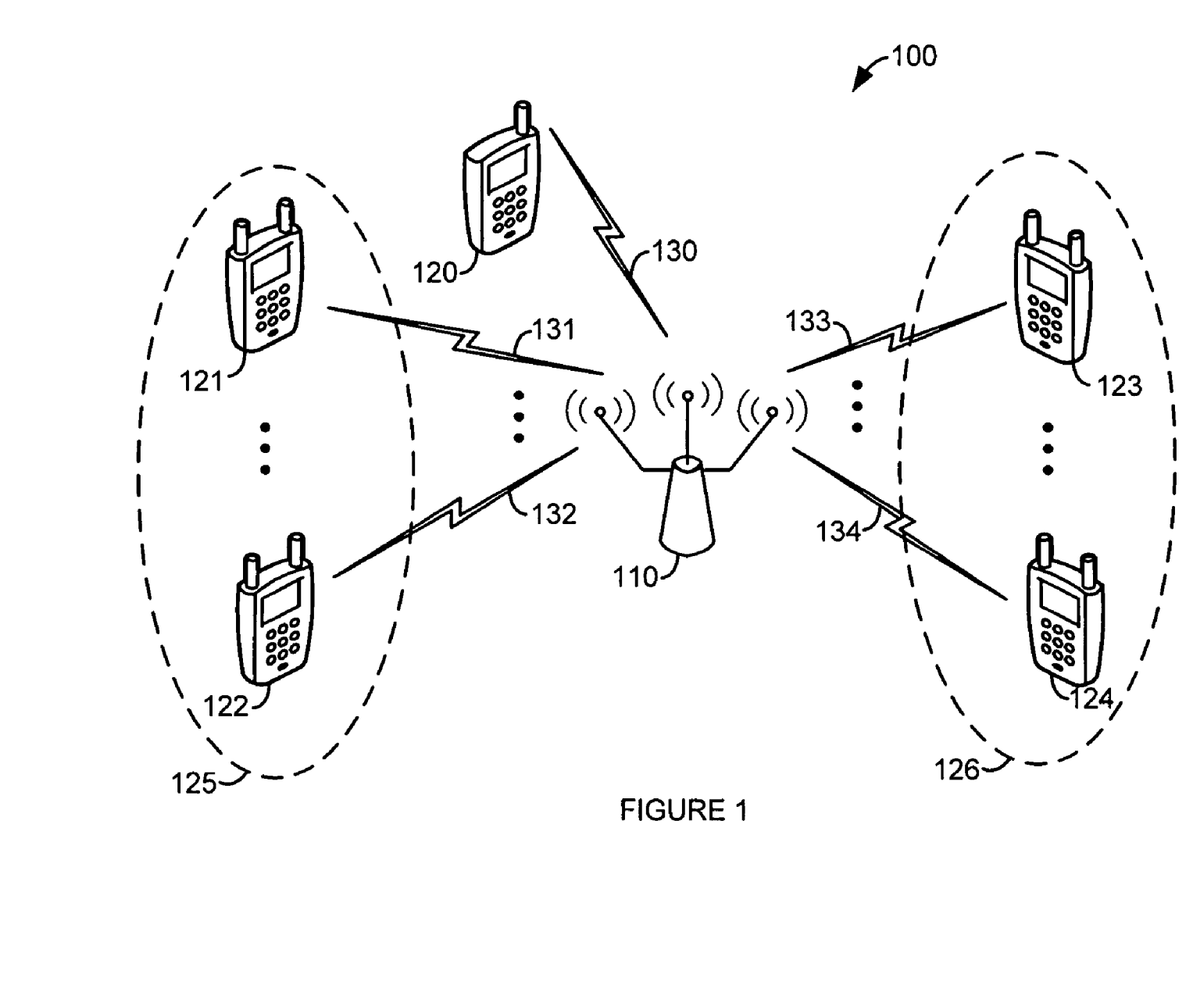
FIG. 1 is a block diagram illustrating a communication system.

FIG. 1 is a block diagram illustrating a communication system. In FIG. 1, communication system 100 comprises: base station 110; requesting device 120; first plurality of wireless devices 125, and second plurality of wireless devices 126. The first plurality of wireless devices 125 is shown in FIG. 1 as comprising wireless device 121 and wireless device 122. First plurality of wireless devices 125 may comprise more than two wireless devices. However, these additional wireless devices have been omitted from FIG. 1 for the sake of brevity. The second plurality of wireless devices 126 is shown in FIG. 1 as comprising wireless device 123 and wireless device 124. Second plurality of wireless devices 126 may comprise more than two wireless devices. However, these additional wireless devices have been omitted from FIG. 1 for the sake of brevity.

Requesting device 120 is operatively coupled to base station 110 via wireless link 130. Wireless devices 121-124 are operatively coupled to base station 110 via wireless link 131-134, respectively. Additional wireless links may operatively couple wireless devices included but not shown in the first plurality of wireless devices 125 and the second plurality of wireless devices 126. However, these wireless links have been omitted for the sake of brevity.

Base station 110 includes multiple antennas and multiple transmitters. Base station 110 may include multiple receivers. Requesting device 120 and wireless devices 121-124 may include multiple antennas, multiple receivers, and multiple transmitters.

Requesting device 120 and wireless devices 121-124 may be any device, system, combination of devices, or other such communication platform capable of communicating with base station 110 using multiple antennas. Requesting device 120 and wireless devices 121-124 may use communication aspects specified by the WiMAX specification including, but not limited to, the MIMO modes detailed therein. Requesting device 120 and wireless devices 121-124 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via multiple antennas. Other types of communication platforms are possible.

Base station 110 may be any wireless system that provides the air interface to wireless devices 121-124 using multiple antennas. Base station 110 may also use one or more transmitters. Base station 110 may also use one or more receivers. Base station 110 may be any wireless system that can provide an air interface to requesting device 120 and wireless devices 121-124. Base station 110 may use communication aspects specified by the WiMAX specification including, but not limited to, the MIMO modes detailed therein. Examples of base stations that may be utilized include, base transceiver stations (BTSs), radio base stations (RBSs), Node B, enhanced Node B (eNBs) and others. Base stations may include a number of elements known to those skilled in the art comprising transceivers, power amplifiers, combiner, duplexer, antennas and control function. Base station 110 may also include other additional components such as a control function or control computer. However, these additional components have been omitted from FIG. 1 for the sake of brevity.

In an embodiment, wireless devices 121-124 may be operated in M by N multiple-input multiple-output (MIMO) modes. M is the number of transmitters and/or antennas that base station 110 is using to transmit a data stream to a given wireless device 121-124. N is the number of receivers and/or antennas that a given wireless device 121-124 is using to receive a data stream from base station 110. In an embodiment, M and N may both be two (2). Thus, a given wireless devices 121-124 would be said to be operating in 2×2 MIMO mode. In another embodiment, M=1 and N=2. Thus, a given wireless device would be said to be operating in 1×2 MIMO mode.

In addition to MIMO modes that specify the number of transmitting and receiving antennas, there are MIMO modes that specify how the data stream is transmitted from the multiple transmitting antennas. A first MIMO mode splits a data stream into multiple lower rate data streams and each data stream is transmitted from a different transmit antenna of base station 110 in the same frequency channel. This mode may be referred to as spatial-multiplexing MIMO (SM-MIMO).

A second MIMO mode transmits multiple redundant copies of a single data stream. The single stream is coded using techniques called space-time coding. The single stream is emitted from each of the transmit antennas of base station 110 using certain principles of full or near orthogonal coding. This mode may be referred to as spatial diversity mode MIMO or space-time coding MIMO (STC-MIMO). In a WiMAX specified system, STC-MIMO may be known as MIMO-A and SM-MIMO as MIMO-B. STC-MIMO, SM-MIMO, along with other multi-antenna techniques where $M>1$ and $N>=1$ may be referred to collectively as multi-antenna modes.

In an embodiment, requesting device 120 may send a request for traffic resources to base station 110. When base station 110 receives the request for traffic resources, the wireless devices of the first plurality of wireless devices 125 may be operating using STC-MIMO. In addition, the wireless devices of the second plurality of wireless devices 126 may be operating using SM-MIMO. Base station 110, or another element of a wireless network (not shown) may determine whether to grant the request for traffic resources based on the number of devices in the first plurality of wireless devices 125 and the second plurality of wireless devices 126.

For example, assume there is a first number of wireless devices in the first plurality of wireless devices 125. Also assume that there is a second number of wireless devices in the second plurality of wireless devices 126. Communication system 100 may determine whether to grant the request based on whether the first number of wireless devices is greater than a first threshold amount, and the second number of wireless devices is less than a second threshold amount. In other words, if there are more than a certain (configurable) number of devices using MIMO-A and less than another (configurable) number of devices using MIMO-B in the cell or sector serviced by base station 110, the request for traffic resources will be denied. Otherwise, it will be granted.

In an embodiment, the ratio of the first number to the second number may be used as a basis for granting or denying the request for traffic resources. For example, if the ratio of the first number divided by the second number is greater than a threshold amount, the request may be denied. Otherwise, the request may be granted.

In an embodiment, the first threshold amount and/or the second threshold amount may be based on a service priority indicator associated with requesting device 120. For example, if requesting device 120 is associated with a "gold" level of service as opposed to a "normal" level of service, the first threshold amount may be adjusted upward and the second threshold amount may be adjusted downward in relation to the thresholds for wireless device with a "normal" level of service. This makes it more likely that a request by a requesting device 120 with a "gold" level of service will be granted.

In an embodiment, the first threshold amount and/or the second threshold amount may be based on an indicator of resource utilization associated with a network element. In other words, if an indicator of network resource utilization (e.g., base station air interface utilization, sector air interface utilization, backhaul utilization, throughput, ASN-GW utilization, etc.) indicates that a network element, such as base station 110, is highly utilized, the first threshold and/or the second threshold may be adjusted such that it is less likely that requests from requesting device 120 will be granted.

Figure 2:
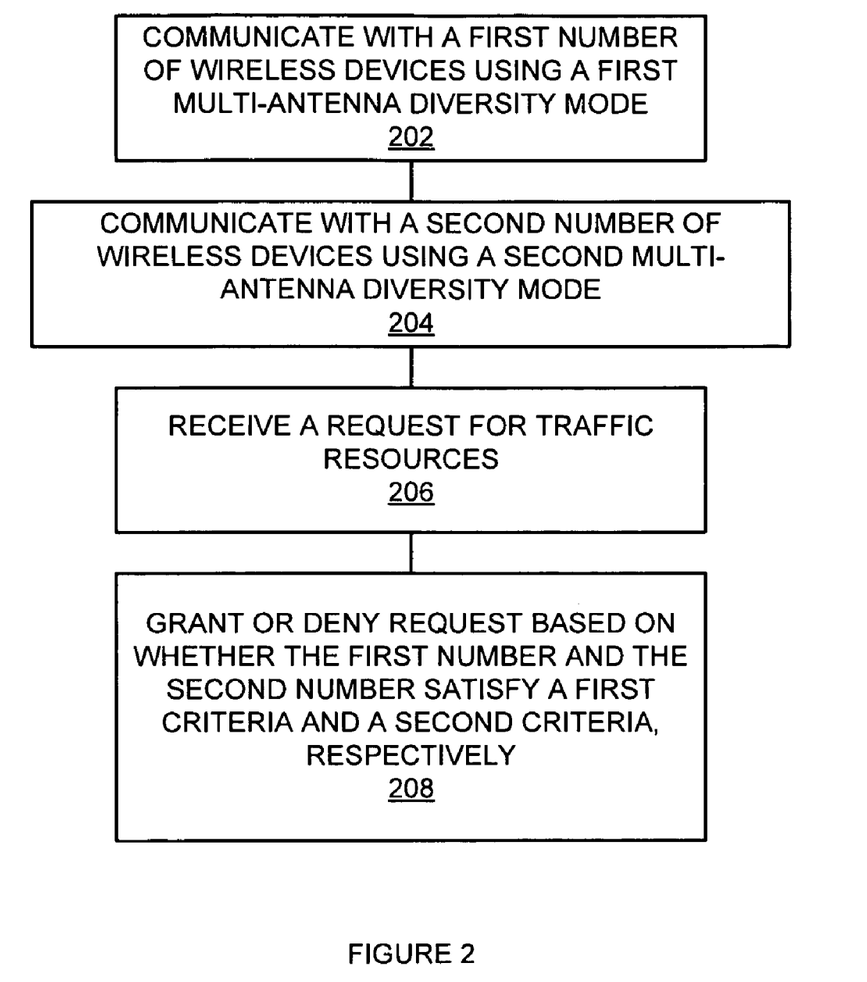
FIG. 2 is a flowchart illustrating a method of operating a communication system.

FIG. 2 is a flowchart illustrating a method of operating a communication system. The steps illustrated in FIG. 2 may be performed by one or more elements of communication system 100. In particular, one or more steps illustrated in FIG. 2 may be performed by base station 110.

A first number of wireless devices are communicated with using a first multi-antenna mode (202). For example, base station 110 may communicate with the first plurality of wireless devices 125 using MIMO-A. There may be a first number of wireless devices in the first plurality of wireless devices 125.

A second number of wireless devices are communicated with using a second multi-antenna mode (204). For example, base station 110 may communicate with the second plurality of wireless devices 126 using MIMO-B. There may be a second number of wireless devices in the first plurality of wireless devices 126.

A request of traffic resources is received (206). For example, base station 110 may receive a request for traffic resources from requesting device 120. The request for traffic resources may be, for example, a request to place a VoIP call. In another example, the request for traffic resources may be a request for bandwidth to download data. Other requests for traffic resources are possible.

The request is granted or denied based on whether the first number and the second number satisfy a first criteria and a second criteria, respectively (208). For example, the request may be denied if the first number is greater than a first threshold and the second number is less than a second threshold. Otherwise, the request may be granted. The first threshold and the second threshold may be dependent upon a number of factors. For example, the first threshold and/or the second threshold may depend upon a quality of service profile associated with the requesting device. In another example, the first threshold and/or the second threshold may depend upon one or more indicators of resource utilization. An example of resource utilization may comprise an air-interface utilization associated with the base station that is communicating with the requesting device. Another example of resource utilization may comprise an air-interface utilization associated with the sector of the base station that is communicating with the requesting device. Indicators of resource utilization of other elements of a wireless network, such as backhaul utilization, may also be used.

Figure 3:
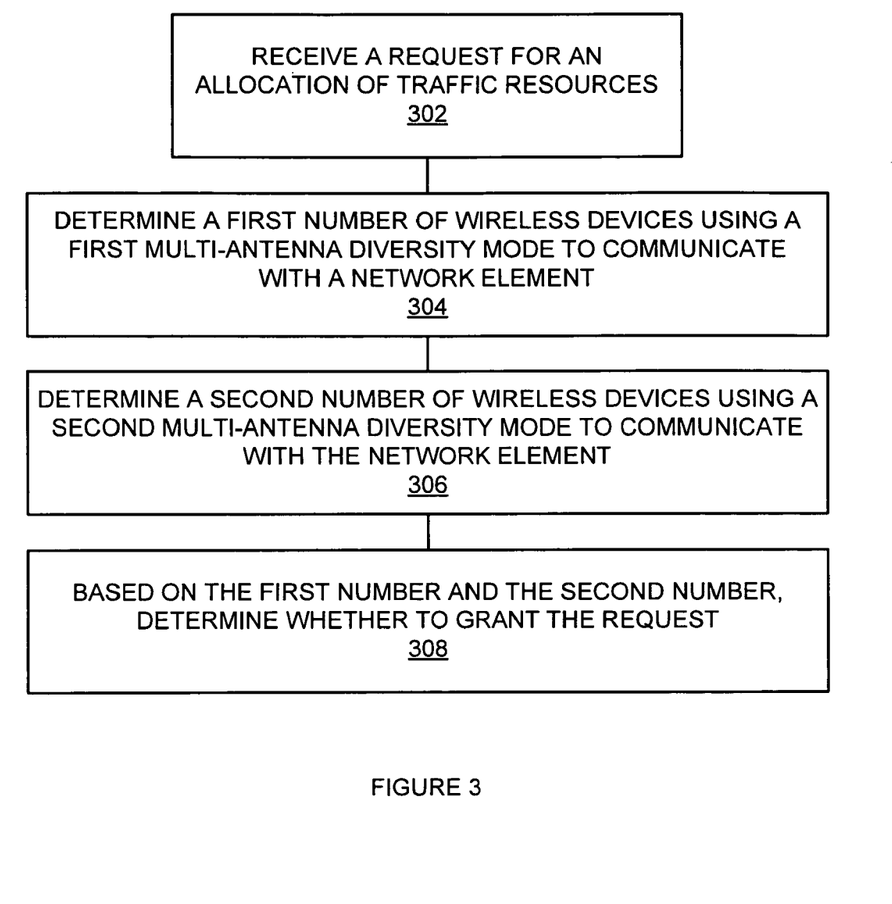
FIG. 3 is a flowchart illustrating a method of allocating traffic resources.

FIG. 3 is a flowchart illustrating a method of allocating traffic resources. The steps illustrated in FIG. 3 may be performed by one or more elements of communication system 100. In particular, one or more steps illustrated in FIG. 3 may be performed by base station 110.

A request for an allocation of traffic resources is received (302). For example, base station 110 may receive a request for air-interface bandwidth from requesting device 120. In another example, base station 110 may receive a request to register requesting device 120 on a wireless network. In another example, base station 110 may receive a request to place a voice call from requesting device 120. Other requests for traffic resources are possible.

A first number of wireless devices using a first multi-antenna mode to communicate with a network element is determined (304). For example, the number of wireless devices using MIMO-A to communicate with base station 110 may be determined. In another example, the number of wireless devices using MIMO-A to communicate with a sector of base station 110 may be determined.

A second number of wireless devices using a second multi-antenna mode to communicate with the network element is determined (306). For example, the number of wireless devices using MIMO-B to communicate with base station 110 may be determined. In another example, the number of wireless devices using MIMO-B to communicate with a sector of base station 110 may be determined.

Based on the first number and the second number, a determination is made whether to grant the request for traffic resources (308). For example, based on the number of devices using MIMO-A to communicate with base station 110, and the number using MIMO-B, a determination may be made (by base station 110 or another element of a wireless network, not shown) whether to grant the request for traffic resources. In an embodiment, the determination to grant the request for traffic resources may be based on the first number satisfying a first criteria and the second number satisfying a second criteria.

For example, communication system 100 may determine whether to grant the request based on whether the first number greater than a first threshold amount, and the second number is less than a second threshold amount. In other words, if there are more than a certain (configurable) number of devices using MIMO-A and less than another (configurable) number of devices using MIMO-B in the cell, sector, or network, the request for traffic resources will be denied. Otherwise, it will be granted.

Figure 4:
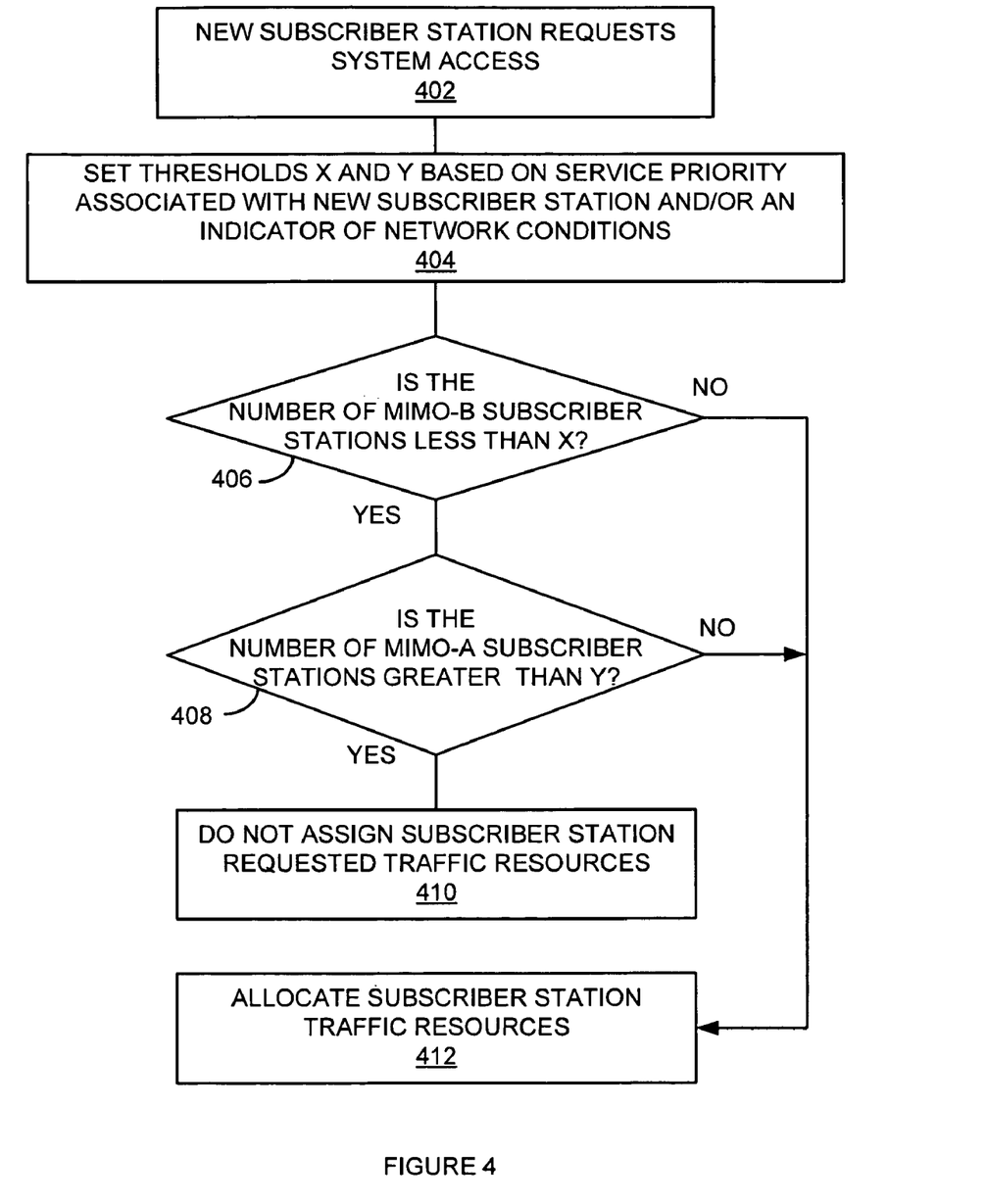
FIG. 4 is a flowchart illustrating a method of allocating traffic resources.

FIG. 4 is a flowchart illustrating a method of allocating traffic resources. The steps illustrated in FIG. 4 may be performed by one or more elements of communication system 100. In particular, one or more steps illustrated in FIG. 4 may be performed by base station 110.

A new subscriber station requests system access (402). For example, requesting device 120 may request to be registered on base station 110. In another example, requesting device 120 is already registered on base station 110, but requests additional traffic resources such as air interface bandwidth.

Thresholds X and Y are set based on a service priority associated with the new subscriber station and/or an indicator of network conditions (404). For example, the thresholds X and Y may be selected from a lookup table that associates a particular X value and a particular Y value with each level of service that may be associated with a wireless device. In another example, the lookup table that associates a particular X value and a particular Y value with each level of service may be selected based on one or more indicators of network conditions. Thus, a lookup table that makes it more difficult to obtain network resources may be selected when an indicator of network conditions shows that one or more elements of a wireless network (such as air interface resources) is highly utilized.

If the number of MIMO-B subscriber stations is less than X, then flow proceeds to block 408 (406). If the number of MIMO-B subscriber stations is not less than X, then flow proceeds to block 412. In block 412, the new subscriber station is allocated the traffic resources it requested.

If the number of MIMO-A subscriber stations is greater than Y, then flow proceeds to block 410. If the number of MIMO-B subscriber stations is not greater than Y, the flow proceed to block 412. In block 410, the new subscriber station is not assigned the requested traffic resources.

The methods, systems, devices, and base stations described above may be implemented with, contain, or be executed by one or more computer systems. The methods described above may also be stored on a computer readable medium. Many of the elements of communication network 100 may be, comprise, or include computers systems. This includes, but is not limited to: communication system 100; first plurality of wireless devices 125, second plurality of wireless devices 126, requesting device 120, wireless devices 121-124, and base station 110.

Figure 5:
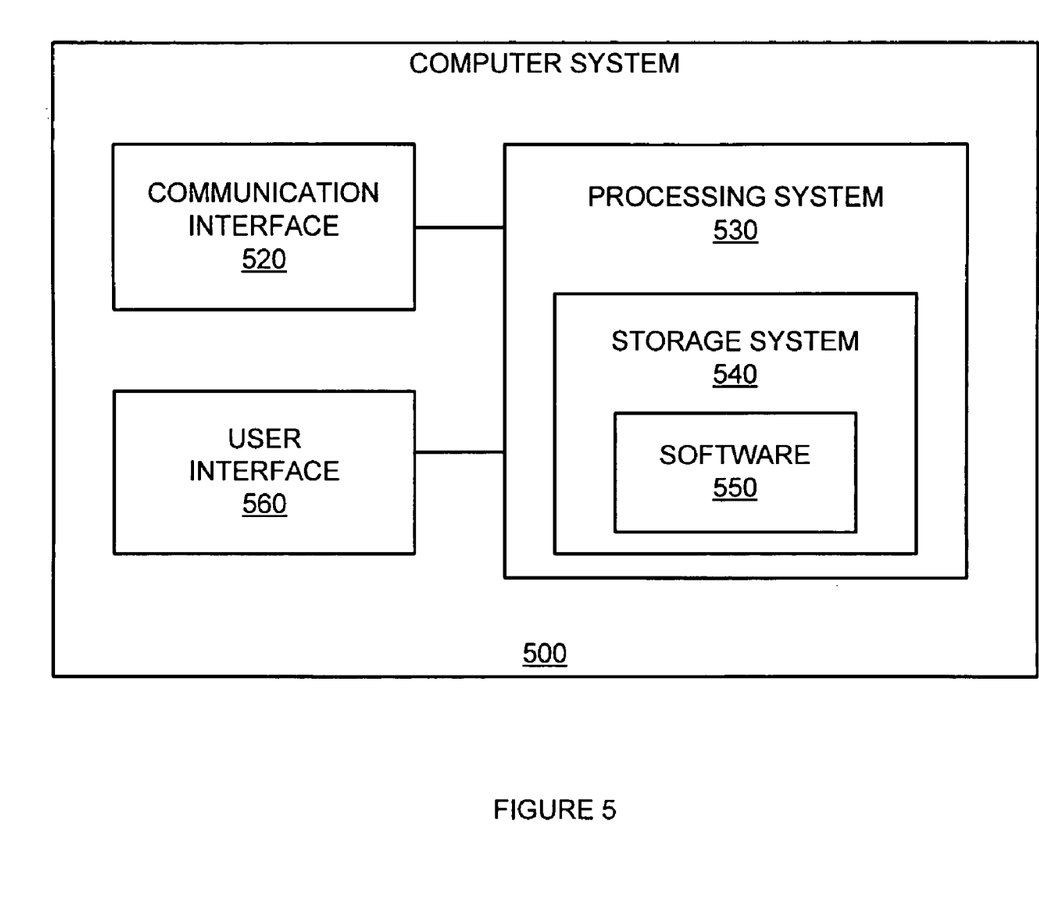
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
communicating, using a first multi-antenna mode, with a first plurality of wireless devices associated with a wireless network element, wherein there is a first quantity of the first plurality of wireless devices;
communicating, using a second multi-antenna mode, with a second plurality of wireless devices associated with the wireless network element, wherein there is a second quantity of the second plurality of wireless devices;
receiving, from a wireless device associated with the wireless network element, a request for traffic resources; and,
in response to the request for traffic resources, granting the request for traffic resources based on whether the first quantity of the first plurality of wireless devices communicating using the first multi-antenna mode satisfies a first threshold quantity criteria and whether the second quantity of the second plurality of wireless devices communicating using the second multi-user multi-antenna mode satisfies a second threshold quantity criteria,
wherein the first threshold quantity is a quantity of wireless devices communicating using the first multi-antenna mode, the second threshold quantity is a quantity of wireless devices communicating using the second multi-antenna mode, and the first and second threshold quantities are each determined based on at least one of a service priority associated with the requesting wireless device and an indicator of network conditions.

2. The method of claim 1, wherein the first multi-antenna mode corresponds to a first multiple-input multiple-output (MIMO) technique and the second multi-antenna mode corresponds to a second MIMO technique.

3. The method of claim 2, wherein the first MIMO technique comprises operating the first plurality of wireless devices in a MIMO mode wherein a data stream is split into multiple lower rate data streams and each data stream is transmitted from a different transmit antenna in the same frequency channel; and,
the second MIMO technique comprises operating the second plurality of wireless devices in a space-time coding MIMO mode.

4. The method of claim 1, wherein the first threshold quantity criteria and the second threshold quantity criteria are based on an indicator of resource utilization associated with the wireless network element.

5. The method of claim 4, wherein the indicator of resource utilization is based on an indicator of air-interface utilization associated with a sector of a base station.

6. The method of claim 4, wherein the indicator of resource utilization is based on an indicator of air-interface utilization associated with a base station.

7. A method of allocating traffic resources, comprising:
receiving a request for an allocation of traffic resources from a wireless device;
determining a first quantity of wireless devices that are using a first multi-antenna mode to communicate with a wireless network element, wherein, if the request for the allocation of traffic resources is granted, the wireless network element will provide traffic resources;
determining a second quantity of wireless devices that are using a second multi-antenna mode to communicate with the wireless network element; and,
based on the first quantity of wireless devices communicating using the first multi-antenna mode satisfying a first threshold quantity criteria, and the second quantity of wireless devices communicating using the second multi-antenna mode satisfying a second threshold quantity criteria, determining whether to grant the request for the allocation of traffic resources,
wherein the first threshold quantity is a quantity of wireless devices communicating using the first multi-antenna mode, the second threshold quantity is a quantity of wireless devices communicating using the second multi-antenna mode, and the first and second threshold quantities are each determined based on at least one of a service priority associated with the requesting wireless device and an indicator of network conditions.

8. The method of claim 7, wherein the first multi-antenna mode and corresponds to a first multiple-input multiple-output (MIMO) technique and the second multi-antenna mode corresponds to a second MIMO technique.

9. The method of claim 8, wherein the first MIMO technique comprises operating a first wireless device in a MIMO mode wherein a data stream is split into multiple lower rate data streams and each data stream is transmitted from a different transmit antenna in the same frequency channel; and, the second MIMO technique comprises operating a second wireless device in a space-time coding MIMO mode.

10. The method of claim 7, wherein the first threshold quantity criteria and the second threshold quantity criteria are based on an indicator of resource utilization associated with the wireless network element.

11. The method of claim 10, wherein the indicator of resource utilization is based on an indicator of air-interface utilization associated with a sector of a base station.

12. The method of claim 10, wherein the indicator of resource utilization is based on an indicator of air-interface utilization associated with a base station.

13. A communication system, comprising:
- a base station in wireless communication with a first quantity of a first plurality of devices, a second quantity of a second plurality of devices, and a requesting device, the first plurality of devices using a first multiple-input multiple-output (MIMO) technique to communicate with the base station, the second plurality of devices using a second MIMO technique to communicate with the base station; and,
- a control system that receives a request for an allocation of base station resources associated with the requesting device, the control system receiving a first indicator of the first quantity of wireless devices communicating using the first MIMO technique and a second indicator of the second quantity of wireless devices communicating using the second MIMO technique, the control system determining whether to grant the request for an allocation of base station resources based on whether the first indicator of the first quantity of wireless devices communicating using the first MIMO technique satisfies a first threshold quantity criteria and whether the second indicator of the second quantity of wireless devices communicating using the second MIMO technique satisfies a second threshold quantity criteria, wherein the first threshold quantity is a quantity of wireless devices communicating using the first MIMO technique, the second threshold quantity is a quantity of wireless devices communicating using the second MIMO technique, and the first and second threshold quantities are each determined based on at least one of a service priority associated with the requesting device and an indicator of network conditions.

14. The communication system of claim 13, wherein the first MIMO technique uses space-time coding.

15. The communication system of claim 13, wherein the second MIMO techniques uses spatial multiplexing.

16. The communication system of claim 13, wherein the first MIMO technique comprises splitting a data stream into multiple lower rate data streams and each data stream is transmitted from a different transmit antenna in the same frequency channel; and, the second MIMO technique comprises space-time coding.

17. The communication system of claim 13, wherein the allocation of base station resources comprises air-interface resources provided by the base station.

* * * * *